US012269236B2

(12) United States Patent
Landwehr et al.

(10) Patent No.: US 12,269,236 B2
(45) Date of Patent: Apr. 8, 2025

(54) METHOD AND APPARATUS FOR COVERING BOXES

(71) Applicant: KOLBUS GMBH & CO. KG, Rahden (DE)

(72) Inventors: Heiko Landwehr, Barnstorf (DE); Leonid Ugorets, Bassum (DE); Dominik Windhorst, Bielefeld (DE); Sandra Engelmeier, Rahden (DE); Nils Brokate, Kirchdorf (DE)

(73) Assignee: Kolbus GmbH & Co. KG, Rahden (DE)

( * ) Notice: Subject to any disclaimer, the term of this patent is extended or adjusted under 35 U.S.C. 154(b) by 108 days.

(21) Appl. No.: 18/007,901

(22) PCT Filed: Jun. 1, 2021

(86) PCT No.: PCT/EP2021/064614
§ 371 (c)(1),
(2) Date: Dec. 2, 2022

(87) PCT Pub. No.: WO2021/245053
PCT Pub. Date: Dec. 9, 2021

(65) Prior Publication Data
US 2023/0271395 A1 Aug. 31, 2023

(30) Foreign Application Priority Data
Jun. 4, 2020 (DE) ..................... 10 2020 114 818.6

(51) Int. Cl.
*B31B 50/62* (2017.01)
*B31B 50/54* (2017.01)
*B31B 120/50* (2017.01)

(52) U.S. Cl.
CPC ............ *B31B 50/624* (2017.08); *B31B 50/54* (2017.08); *B31B 2120/50* (2017.08)

(58) Field of Classification Search
CPC ....... B31B 50/624; B31B 50/54; B31B 50/44; B31B 50/442; B31B 50/444; B31B 50/52;
(Continued)

(56) References Cited

U.S. PATENT DOCUMENTS 690,377 A * 12/1901 Smith ..................... B31B 50/44 493/113
1,341,954 A * 6/1920 Weightman ............. B31B 50/44 493/379
(Continued)

FOREIGN PATENT DOCUMENTS

DE 851896 C 10/1952
DE 2911969 A1 10/1980
WO 2015079342 A1 6/2015

OTHER PUBLICATIONS

PCT International Search Report and Written Opinion for International Application No. PCT/EP2021/064614 filed Jun. 1, 2021; Date of Mailing: Aug. 24, 2021; 12 pgs.
(Continued)

*Primary Examiner* — Joshua G Kotis
*Assistant Examiner* — Scott A Howell
(74) *Attorney, Agent, or Firm* — Alix, Yale & Ristas, LLP

(57) ABSTRACT

Covering of raw boxes with a sheet blank in a box laminating machine with a rubbing-down device that sweeps or rolls over the surface to be covered and a counter-holder that interacts with said rubbing-down device, wherein the rubbing-down operation takes place during a transport movement of the box and the counter-holder plunges into the box in order to support the wall to be covered against the rubbing-down device.

8 Claims, 2 Drawing Sheets

(58) Field of Classification Search
CPC ..... B31B 50/46; B31B 50/73; B31B 2120/50; B31B 2120/406
See application file for complete search history.

(56) References Cited

U.S. PATENT DOCUMENTS

| | | | | |
|---|---|---|---|---|
| 1,343,748 | A * | 6/1920 | Reifsnyder | B31B 70/00 493/111 |
| 2,075,605 | A | 3/1937 | Fleischer et al. | |
| 2,083,351 | A * | 6/1937 | Sidebotham | B31B 50/52 493/55 |
| 2,111,157 | A * | 3/1938 | Stokes | B31B 50/72 493/110 |
| 2,111,700 | A * | 3/1938 | Stokes | B31B 70/00 493/110 |
| 2,757,586 | A * | 8/1956 | Haessler | B31B 50/042 493/111 |
| 2,761,359 | A | 9/1956 | Sargent | |
| 2003/0066871 | A1* | 4/2003 | Dalrymple | B65D 5/002 493/132 |
| 2009/0156380 | A1* | 6/2009 | Calugi | B31B 50/742 493/111 |
| 2009/0280973 | A1* | 11/2009 | Graham | B65D 5/003 493/131 |
| 2018/0029744 | A1* | 2/2018 | Graham | B65D 5/28 |

OTHER PUBLICATIONS

PCT International Search Report and Written Opinion for International Application No. PCT/EP2021/064620 filed Jun. 1, 2021; Date of Mailing: Aug. 24, 2021; 13 pgs.

* cited by examiner

METHOD AND APPARATUS FOR COVERING BOXES

BACKGROUND

The present invention pertains to a method for covering boxes according to the preamble of claim 1 and to an apparatus for carrying out the method according to the preamble of claim 6.

A system for producing boxes with an apparatus for covering the raw boxes is disclosed in publication US2009/0156380A1. In this system, the raw boxes and the cover material provided with glue, i.e., the sheet blanks, are fed from respective upstream apparatuses to a joining device by means of transport devices. This joining device places the bottom of the raw box on the glued side of the sheet blank. The sheet blank is rolled down on all four box walls in a downstream apparatus. Any protrusion of the sheet blank is turned inward. A covering device is assigned to each wall for this purpose.

The four covering devices are arranged opposite of one another in pairs. They respectively have a rubbing-down roller and a turn-in slide. Joining of the sheet on the outer walls takes place by rolling the rubbing-down rollers on the outer sides of the box. For this purpose, the box is vertically transported through between the stationary first pair of covering devices in a first step. The box subsequently remains in a resting position and the turn-in slides of the first pair turn the protrusions of the sheet blank inward. Subsequently, the second pair of covering devices rolls the sheet on the remaining walls in a vertical movement of their rubbing-down rollers before their turn-in slides turn in the remaining protrusions. A form punch is subsequently lowered into the covered box in order to rub down the turned-in cover on the inner sides of the box.

Such a covering device allows a compact construction. However, one disadvantage can be seen in the resulting poor accessibility of the components. Cleaning of the elements that come in contact with the cover sheet particularly is impeded. Only one pair can process the box at all times due to the arrangement of the covering devices relative to one another. The other pair has to wait until this processing is completed or the box is transported out of the apparatus. The capacity of the system therefore remains limited. The form punch has to be manufactured extremely true to size in order to reliably glue the turn-ins of the sheet to the inner surfaces of the raw box on the one hand and to prevent damages to the box on the other hand. This requires a separate form punch for each inside dimension of a box to be produced. Format deviations of the raw boxes, e.g., due to manufacturing tolerances or climatic influences, also lead to corresponding quality losses of the finished boxes or even rejects.

SUMMARY

An objective of the present invention therefore can be seen in developing an apparatus that is improved in comparison with the prior art, eliminates at least one of the aforementioned disadvantages of the prior art and meets the increased requirements regarding the product quality to be achieved.

The box laminating machine comprises different processing devices and transport devices. These processing devices are arranged on the transport paths of the transport devices. A transport system successively transports the respective blank box to be covered into different processing stations of the box laminating machine for processing. In this case, the transport of the blank box to be covered takes place in a plane extending parallel to the bottom of the blank box. However, the laminating machine at least comprises a transport device and a side rolling-down device.

This side rolling-down device is arranged on the transport path of the transport device. It has at least one rubbing-down element and one counter-holder assigned to this rubbing-down element. The counter-holder plunges into the raw box. The rubbing-down element subsequently rubs down the corresponding wall region of the sheet blank on the associated wall of the raw box against the counter-holder. For this purpose, the rubbing-down element sweeps over the wall of the box in a rubbing-down movement. The rubbing-down operation takes place during the continuing transport movement of the raw box. In this context, it is irrelevant whether the rubbing-down element is formed by a rail, a brush or an optionally driven roller.

The apparatus has a first guidance system of the rubbing-down element, which defines the movement path of the rubbing-down element. A second guidance system of the counter-holder defines the movement path of the counter-holder. This movement path of the counter-holder comprises at least one segment that is oriented parallel to the transport path of the raw box. The rubbing-down operation during the continuing transport of the box allows a temporal overlap of movements such that an increased throughput can be achieved.

The movement of the counter-holder is advantageously composed of multiple linear partial movements. The movement of the counter-holder particularly is formed by two partial movements that run orthogonal to one another. These partial movements do not necessarily take place successively. In fact, they may overlap in time such that a curved overall movement of the counter-holder takes place.

In this context, a first linear partial movement preferably runs parallel to a surface normal of the bottom of the blank box. The first partial movement then is directed toward or away from the bottom surface. A second linear partial movement runs orthogonal to this first partial movement and therefore parallel to the bottom of the blank box and parallel to the transport direction of the blank box.

The second partial movement advantageously is at least temporarily identical to the continuing transport movement of the box with respect to its direction and amount. A relative movement between the counter-holder and the raw box is precluded as long as the rubbing-down element exerts a force upon the wall and the counter-holder in that the counter-holder plunged into the box is moved in the same way as the raw box during the rolling-down operation. The counter-holder can be designed true to format and support the wall over its entire surface.

A closed, revolving movement of at least the counter-holder is advantageously realized. In this way, the sequences of movement of the individual elements can overlap in a particularly time-saving manner.

In a particularly advantageous embodiment, the second guidance system assigned to the counter-holder has at least one first linear guide. This first linear guide is aligned parallel to the transport direction. This makes it possible to reliably prevent undesirable movements of the counter-holder transverse to the transport direction, which affect the quality of the box.

The second guidance system assigned to the counter-holder preferably comprises a second linear guide that defines a movement plane together with the first linear guide. The first partial movement and the second partial movement run parallel to this plane defined by the linear guides. In this way, any two-dimensional movement patterns, particularly curved movement patterns, can be imparted on the counter-holder. The second linear guide preferably is arranged orthogonal to the first linear guide.

As an alternative to multiple linear guides, the second guidance system assigned to the counter-holder may also have a curved guide. In this case, this curved guide defines the first linear movement segment and the second linear movement segment.

According to a special embodiment, the width of the counter-holder corresponds to the inside length of the raw box. The associated wall therefore is supported over its entire surface and undesirable damages are prevented. In this case, one of its partial movements follows the transport movement of the blank box with respect to its direction and speed. This synchronous movement of the box and the counter-holder prevents relative movements between the box and the counter-holder as long as the rubbing-down element exerts a force upon the wall. This makes it possible to prevent quality losses.

The counter-holder preferably is formed by two interconnected rails. At least a section of the respective rails is with respect to time and space at least sectionally arranged opposite of the rubbing-down element. These rails preferably are spaced apart from one another in such a way that the jointly formed contour is narrower than the inner side of the associated wall of the raw box. In this way, the counter-holder can be easily introduced into the raw box and inadvertent displacements of or damages to the raw box are prevented. In this context, the greatest possible spacing between the rails is advantageous for reliably preventing the undesirable tendency of the box to rotate about the rails during the rolling-down operation.

The extent of the individual rails forming the counter-holder in the transport direction of the blank boxes preferably is small in relation to the length of the blank box in the same direction. A supporting plate is arranged between the rails in order to bridge the thusly formed gap. The supporting plate forms the counter-holder together with the rails. In this way, the counter-holder can be adjusted to different lengths by simply exchanging the supporting plate.

The bottom of the box is aligned horizontally during the entire rubbing-down operation in order to allow a simple construction and easy accessibility.

The box laminating machine preferably comprises multiple side rolling-down devices of this type along the transport path such that all walls of the blank can be covered in one pass of the box.

BRIEF DESCRIPTION OF THE DRAWINGS

An exemplary embodiment of the invention is described below with reference to the figures, to which we refer with respect to all details that are not mentioned in greater detail in the description. In these figures.

DETAILED DESCRIPTION

Figure 1:
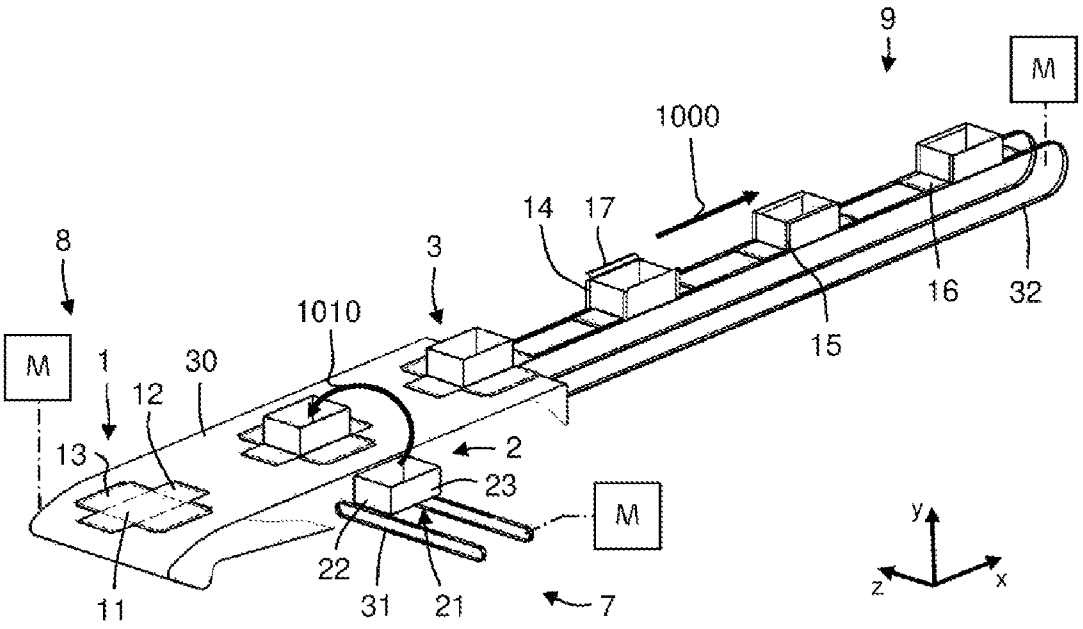
FIG. 1 shows a schematic representation of the product flow and the associated transport devices of an apparatus for covering boxes.

FIG. 1 schematically shows the product flow during a box covering operation. The raw boxes 2 are respectively made available in a standby position by an infeed 7. For this purpose, the box infeed 7 has a transport device with a first conveyor belt 31. The raw boxes 2 are moved into the standby position such that their bottom 21 points downward and is aligned horizontally. The end walls 22 of the raw box 2 are oriented parallel to the feed direction whereas the sidewalls 23 are oriented transverse to the feed direction. The feed direction extends transverse to the transport path 1000, on which the processing devices 100, 200 are arranged. The standby position of the raw boxes is arranged adjacent to a band conveyor 30 of the sheet infeed 8 supplying the sheet blanks 1.

The sheet blanks 1 are glued individually, transferred to the band conveyor 30 and moved along a linear transport path 1000. Suitable apparatuses for applying glue on the sheet 1 are sufficiently known and therefore not illustrated in the figures or described in greater detail. A not-shown robot picks up the supplied raw box 2 and places it on the bottom region 11 of the cover sheet 1 in an accurately positioned manner in a curved downward movement 1010. The now connected unit 3 consisting of the raw box 2 and the sheet blank 1 glued to its bottom 21 is transferred to a conveyor device 9 that follows the band conveyor 30 and has the same transport direction 1000.

Figure 2:
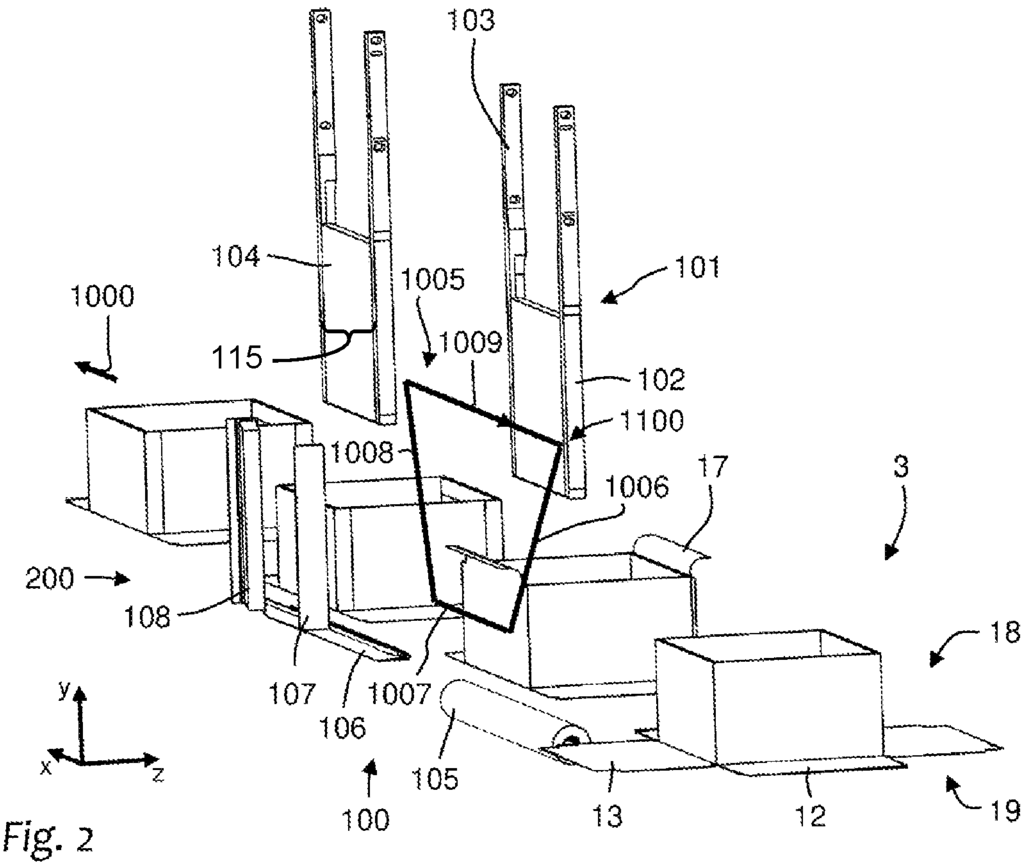
FIG. 2 shows a schematic representation of a side rolling-down device and a flap rubbing-down device.

The conveyor belts 32 of this conveyor device 9 transport the box units 3 through the processing devices 100, 200 arranged along the transport path 1000 in order to completely cover the box units 3. FIG. 2 shows the elements 101, 105, 106 of a side rolling-down device 100 that interact with the box unit 3. A second, identical side rolling-down device arranged on the opposite side is not illustrated in order to provide a better overview.

A rubbing-down roller 105 is illustrated in its starting position underneath the movement path of the box units 3. The rubbing-down roller 105 is essentially cylindrical. Its rotational axis extends parallel to the transport direction 1000 of the box units 3. The rubbing-down roller 105 rolls on the sidewall 23 in a vertical partial movement 1004 from its starting position and in the process rolls down the associated outer region 13 of the sheet blank 1 on the sidewall 23.

A counter-holder 101 is provided in order to support the sidewall 23 against the rubbing-down roller 105 during the rolling-down operation. This counter-holder 101 is formed by a pair of rails 102, 103. A supporting plate 104 is arranged between the rails 102, 103 in order to realize a full-surface support. These elements jointly form a supporting surface 115 that extends parallel to the associated box wall 23. Linear guidance systems are provided in order to allow a revolving movement 1005 of the counter-holder 101. A horizontally oriented linear guide 111 is arranged parallel to the transport path 1000 of the box units 3. It accommodates a vertically aligned linear guide 109 in the manner of a coordinated table. The rails 102, 103 of the counter-holder 101 are accommodated in the vertical linear guide 109. The vertical guide 109 is connected to a drive 112 in such a way that it can be moved along the horizontal guide 111. The vertical partial movement 1002 of the counter-holder 101 is generated by another drive 110 that acts upon the rails 102, 103. This drive 110 for the vertical partial movement 1002 of the counter-holder 101 comprises a guide track 114 that can be vertically moved in a motor-driven manner. This guide track extends parallel to the transport direction 1000 of the box units 3. A roller 113 arranged on a rail 103 of the counter-holder runs in the guide track 114 in order to transmit its vertical movement 1002 to the counter-holder 101.

The counter-holder 101 plunges into the raw box 1 from its starting position 1100 above the box unit 3 during a closed, revolving movement 1005 on the sidewall 23 while the box 3 is continuously transported in the predefined direction 1000 by the belts 32. The revolving movement 1005 of the counter-holder 101 essentially takes place in a plane extending parallel to its supporting surface 115. In FIG. 2, this plane is defined by the transport path 1000 of the box units 3, which extends in a horizontal x-direction, and a vertical y-direction. The revolving movement 1005 is composed of multiple segments. The lowering segment 1006 into the box 3 begins in the starting position 1100 above the box unit 3 and ends within the box unit 3 at or slightly above its bottom 21. It can be dissected into a vertical portion 1002 and a simultaneous horizontal portion 1001. The lowering segment 1006 essentially is characterized by a vertical downward movement relative to the box. The lowering segment 1006 is followed by a holding segment 1007, during which the counter-holder 101 maintains a fixed position relative to the box unit 3. The counter-holder 101 moves synchronous with the box unit 3 in its transport direction 1000. The actual rubbing-down operation of an outer region 13 of the sheet blank 1 on the outer surface of the associated box wall 23 by means of the rubbing-down roller 105 takes place during this holding segment 1007. The subsequent lifting segment 1007 corresponds to the lowering segment 1006 with a reversed vertical partial movement 1002. The counter-holder 101 subsequently returns into its starting position 1100 in a horizontal return movement 1009.

Figure 3:
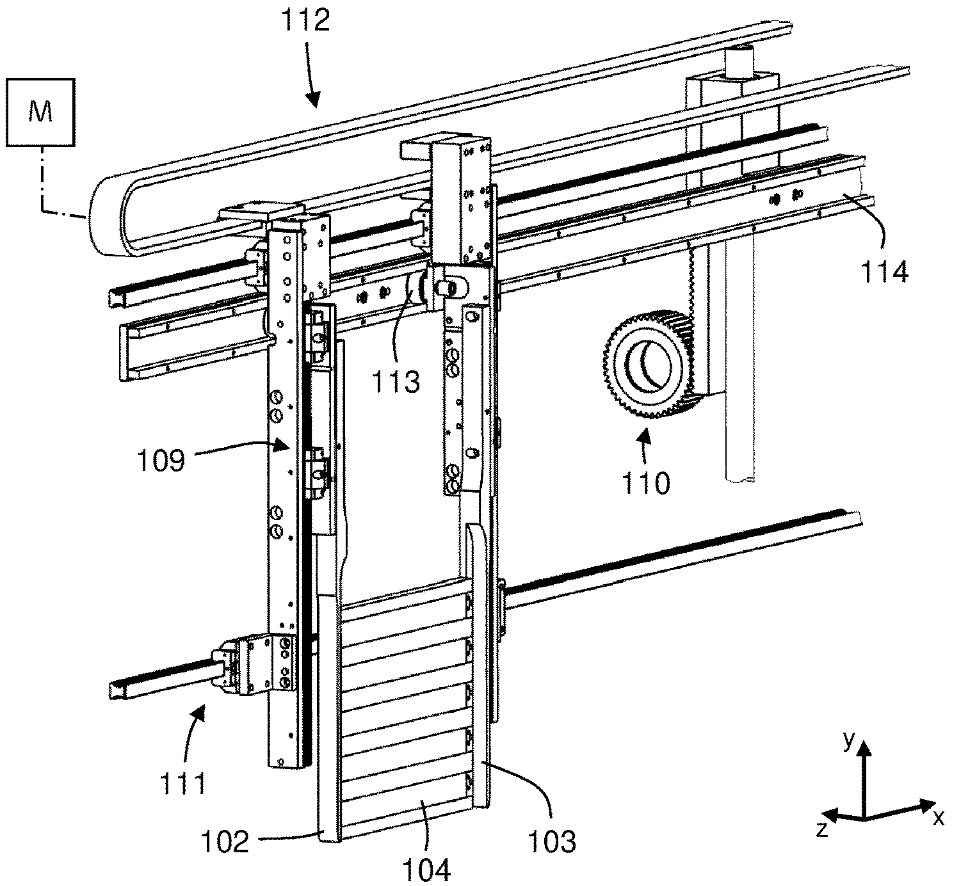
FIG. 3 shows a counter-holder of a side rolling-down device.
Figure 4:
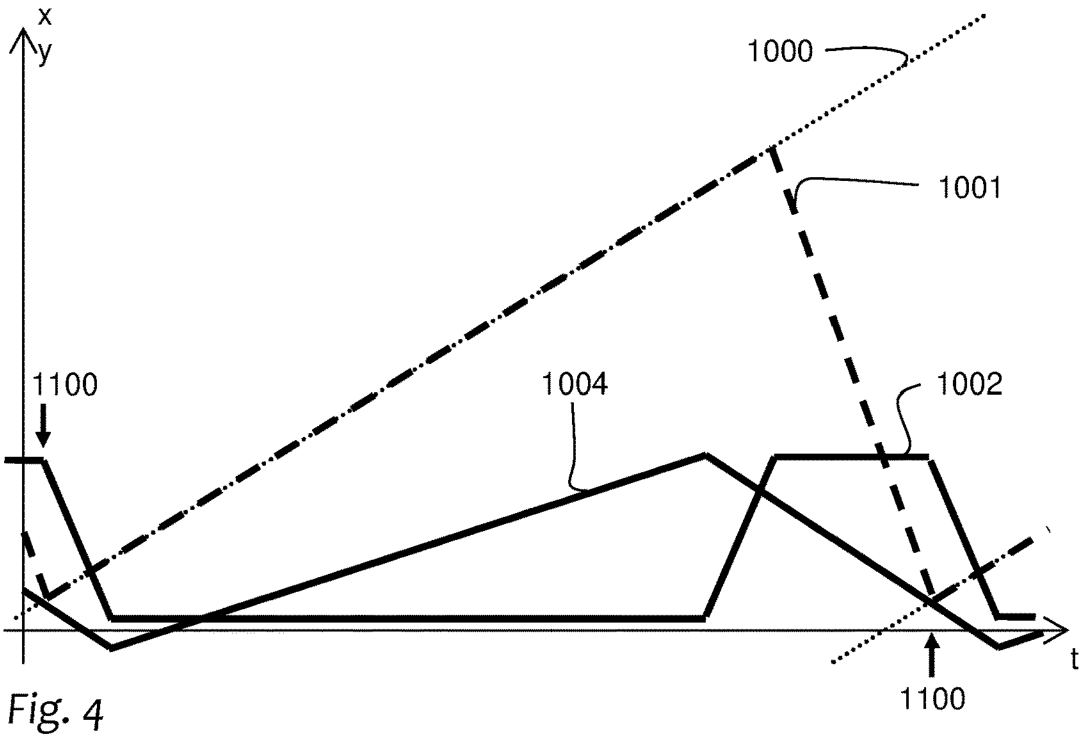
FIG. 4 shows a movement diagram.

FIG. 4 shows the temporal correlations between the partial spatial movements 1000, 1001, 1002, 1004 in accordance with the coordinate systems in the illustrations in FIGS. 1 to 3 in the form of a movement diagram. In this case, all movements 1000, 1001, 1002, 1004 are illustrated in a simplified manner and composed of linear portions with different gradients. The transport movement 1000 of the box unit 3 is illustrated in the form of a dotted line. It extends in the form of an ascending straight line in the x-direction as a function of the time t.

The horizontal movement 1001 of the counter-holder 101 is illustrated with a broken line and divided into the holding segment 1007 and the return movement 1009. The progression of the horizontal movement 1001 is identical to the transport movement 1000 of the box units 3 during the holding segment 1007. The vertical partial movement 1002 of the counter-holder 101 is illustrated with a continuous line. The coinciding gradient jumps of the vertical partial movement 1002 and the horizontal partial movement 1001 of the counter-holder 101 characterize its starting position 1100. The holding segment 1007 is defined by the lower end position of the vertical movement 1002. FIG. 4 clearly shows that the segment of the horizontal movement 1001, which takes place synchronous with the transport movement 1000, comprises in terms of time the movement segments lowering 1006, holding 1007 and lifting 1008.

The vertical partial movement 1004 of the rubbing-down roller 105 is likewise illustrated with a continuous line. The rubbing-down operation takes place during the upward movement. This upward movement coincides with the holding segment 1007 of the counter-holder 101. The horizontal partial movement of the rubbing-down roller 105 ensures that a rolling movement on the box unit 3 only runs perpendicular to the bottom 21. A relative movement of the rubbing-down roller 105 transverse to the box 3 is prevented. The horizontal partial movement of the rubbing-down roller 105 is not illustrated, but simply identical to the horizontal partial movement 1001 of the counter-holder.

The movement diagram in FIG. 4 shows the sequences of movement in a schematically simplified manner. Curved transitions may be chosen instead of the gradient jumps. This particularly makes it possible to advantageously influence the machine dynamics. In addition, the movement segments and partial movements shown may shift relative to one another or overlap. In this way, the loads occurring due to the machine dynamics can be additionally reduced and the processing times can be improved. These adaptations can be optimized in dependence on the dimensions of the boxes 2 or the sheet blanks 1.

REFERENCE SYMBOLS

1 Sheet blank
2 Raw box
3 Partially covered box
4 Box, finished
5 Glue
7 Raw box infeed
8 Sheet infeed
9 Box transport
11 Bottom region
12 Outer region, end wall
13 Outer region, sidewall
14 Side flap, left
15 Side flap, right
16 Turn-in, end wall
17 Turn-in, sidewall
18 Adhesive side
19 Outer side
21 Bottom
22 End wall
23 Sidewall
30 Band conveyor
31 First conveyor belt, box infeed
32 Second conveyor belt, box covering
100 Side rolling-down device, left sidewall
101 Counter-holder, left
102 Rail, left rear
103 Rail, left front
104 Supporting plate
105 Rubbing-down element, left
106 Turn-in rail, left
107 Rubbing-down element, left front
108 Rubbing-down element, left rear
109 Linear guide, vertical
110 Drive, vertical stroke
111 Linear guide, horizontal
112 Drive, horizontal stroke
113 Roller
114 Rail, optionally curve
115 Supporting surface, counter-holder
200 Flap rubbing-down device
1000 Transport path, box
1001 Partial movement, counter-holder horizontal (x)
1002 Partial movement, counter-holder vertical (y)
1003 Partial movement, counter-holder transverse (z)
1004 Partial movement, rubbing-down element vertical (y)
1005 Revolving movement, counter-holder
1006 Lowering segment, counter-holder
1007 Holding segment, counter-holder
1008 Lifting segment, counter-holder
1009 Return movement, counter-holder
1010 Downward movement, raw box
1100 Starting position, counter-holder

The invention claimed is:

1. A method for covering boxes with at least one flexible sheet blank by means of adhesive joining in a box laminating machine, wherein;

the boxes to be covered have at least one plane bottom and multiple plane walls with at least one outer joining surface, with said walls being connected to the at least one bottom and arranged orthogonal thereto, the at least one sheet blank formed by at least one material sheet and has at least one joining surface, the at least one outer joining surface of the at least one bottom or at least one wall of the box is adhesively joined with the at least one joining surface of the at least one sheet blank to form a box unit, the box laminating machine comprises multiple processing stations and the box to be covered successively passes through these multiple processing stations, wherein at least one of the processing stations comprises at least one rubbing-down device, the at least one rubbing-down device has at least one rubbing-down element and at least one counter-holder corresponding to the at least one rubbing-down element, the method comprising:

transporting the box to be covered between the processing stations in a plane that extends parallel to the at least one bottom of the box to be covered;

plunging the at least one counter-holder of the rubbing-down device into the box and into contact with an inner surface of a wall to be covered, moving the at least one rubbing-down element of the rubbing-down device over an outer side of the wall to be covered in a rubbing-down movement, wherein beginning the rubbing-down movement of the at least one rubbing-down element of the at least one rubbing-down device adjacent to or at an edge of the already joined surfaces of the box unit and sweeping the rubbing-down element over a surface of the box unit to be covered during the rubbing-down movement, the rubbing-down movement of the at least one rubbing-down element of the at least one rubbing-down device takes place while the at least one counter-holder of the at least one rubbing-down device, which corresponds to this at least one rubbing-down element, is in contact with the inner surface of the wall to be covered, wherein a rubbing-down operation, to include the rubbing-down movement, of the at least one joining surface by means of the at least one rubbing-down device takes place during a continuing transport movement of the box to be covered, with said transport movement running parallel to the at least one bottom of the box to be covered, and wherein a movement of the at least one counter-holder of the at least one rubbing-down device is at least composed of a first partial movement and a second partial movement, wherein the first partial movement runs parallel to a surface normal of the bottom of the box and the second partial movement runs orthogonal to the first partial movement and parallel to the transport direction of the box during the rubbing-down operation.

2. The method of claim 1, wherein the second partial movement of at least the at least one counter-holder is at least temporarily identical to the continuing transport movement of the box to be covered with respect to its direction and distance travelled by the box in the transport direction.

3. The method of claim 1, comprising a closed, revolving movement of the at least one rubbing-down element and a closed, revolving movement of the at least one counter-holder corresponding to the at least one rubbing-down element.

4. The method of claim 1, comprising a horizontal alignment of the bottom of the respective-box to be covered at least during the rubbing-down movement of the at least one rubbing-down element of the at least one side rubbing-down device.

5. An apparatus for respectively covering boxes with at least one flexible sheet blank by means of adhesive joining, wherein the boxes to be covered respectively have at least one plane bottom and multiple plane walls with at least one outer joining surface, with said walls being connected to the at least one bottom and arranged orthogonal thereto, wherein the at least one flexible sheet blank is formed by at least one material sheet and has at least one joining surface, and wherein at least one outer joining surface of the at least one bottom and/or at least one wall of the box is adhesively joined with the at least one joining surface of the at least one flexible sheet blank, with said apparatus at least comprising:

a transport device with at least one transport element that captures the boxes to be covered and moves them along a transport path extending parallel to the at least one bottom of the box to be covered, a rubbing-down device that is arranged on the transport path and includes at least one movable rubbing-down element and at least one movable counter-holder corresponding to the at least one rubbing-down element, a first guidance system that is connected to the at least one movable rubbing-down element and a second guidance system that is connected to the at least one movable counter-holder, wherein the first guidance system defines the movement path of the at least one movable rubbing-down element and the second guidance system defines the movement path of the at least one movable counter-holder, wherein the movement path of the at least one movable counter-holder, which is defined by the second guidance system, has at least one movement segment, wherein the at least one movement segment is linear and oriented parallel to the transport path, and wherein a movement of the at least one movable counter-holder of the rubbing-down device is at least composed of a first partial movement and a second partial movement, wherein the first partial movement runs parallel to a surface normal of the bottom of the box and the second partial movement runs orthogonal to the first partial movement and parallel to the transport direction of the box during the rubbing-down operation.

6. The apparatus of claim 5, said second guidance system comprising at least two linear guides of the at least one counter-holder, which are arranged orthogonal to one another, wherein at least the first linear guide is oriented parallel to the transport path of the boxes to be covered.

7. The apparatus of claim 5, wherein the at least one counter-holder comprises at least two interconnected rails, wherein the at least two rails are at least temporarily and sectionally arranged in a working region of the at least one rubbing-down element corresponding to the at least one counter-holder, as well as at a variable distance from one another, such that the interconnected rails jointly support at least a region of the wall of the box to be covered against the corresponding rubbing-down element.

8. The apparatus of claim 7, wherein the at least one counter holder comprises at least one supporting plate arranged between the at least two rails of the at least one counter-holder, such that the plate supports at least a region of the wall of the box to be covered against the corresponding rubbing-down element together with the at least two rails of at least one counter-holder.

* * * * *